United States Patent [19]

Heinen

[11] Patent Number: 4,858,328
[45] Date of Patent: Aug. 22, 1989

[54] MANUALLY MANIPULATED DISTANCE MEASURING TOOL

[76] Inventor: Dennis Heinen, N5744 Hwy. 57, Belgium, Wis. 53004

[21] Appl. No.: 257,201

[22] Filed: Oct. 13, 1988

[51] Int. Cl.[4] .................................................. G01B 3/12
[52] U.S. Cl. ............................................ 33/722; 33/779
[58] Field of Search ..................... 33/141 R, 141 E; 446/450; 285/397, 398

[56] References Cited

U.S. PATENT DOCUMENTS

| | | | |
|---|---|---|---|
| 231,262 | 8/1880 | Bowker | 285/397 X |
| 925,082 | 6/1909 | Davenport | 33/141 E |
| 959,546 | 5/1910 | Kenny | 285/397 |
| 1,718,052 | 6/1929 | Lineaweaver . | |
| 2,121,867 | 6/1938 | Gandrud | 33/141 R |
| 2,294,566 | 9/1942 | Malm et al. . | |
| 2,614,330 | 10/1952 | Cederholm | 33/141 E |
| 2,741,031 | 4/1956 | Martin, Jr. et al. . | |
| 3,151,397 | 10/1964 | King et al. | 33/141 E |
| 3,497,959 | 3/1970 | Engelsman . | |
| 3,835,453 | 9/1974 | Narayanan . | |
| 3,881,277 | 5/1975 | Delph | 446/450 |
| 4,176,458 | 12/1979 | Dunn . | |

Primary Examiner—Harry N. Haroian
Attorney, Agent, or Firm—Andrus, Sceales, Starke & Sawall

[57] ABSTRACT

A manually operated distance measuring tool is a ring which is manually rolled along the ground. The ring is provided with a coating having equally spaced imprinted measurement marks on the inner surface. The ring has diameter providing for a ten foot increment for each complete revolution of the circular member. Thus the number of total revolutions is directly covertible into a whole number of feet by merely adding a zero to the number of counted complete revolutions and then adding the final reading. The marks are measured from a starting location identified by an encircling tape of a different color and center enlarged loop. In using of the tool, the operator rolls the circular member along the ground manually and mentally records each revolution from the starting point to the finish point. The final measurement is recorded in accordance with the specific marking.

6 Claims, 1 Drawing Sheet

U.S. Patent    Aug. 22, 1989    4,858,328
FIG. 1
FIG. 2
FIG. 4
FIG. 3
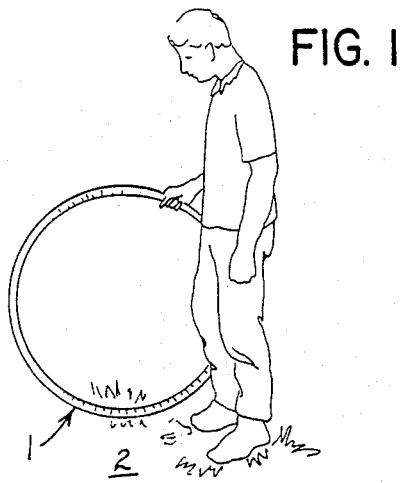
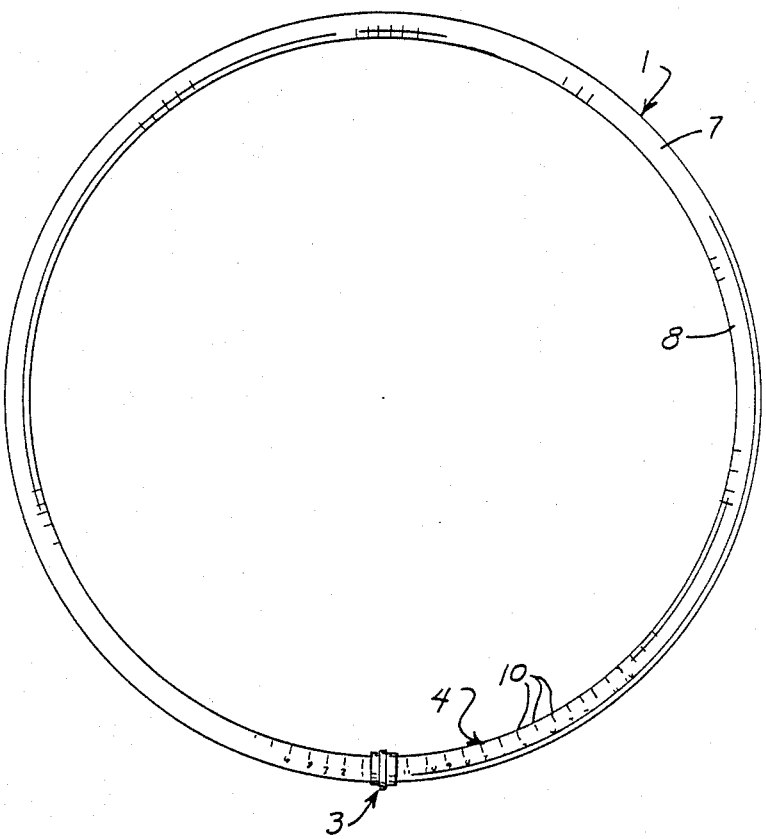
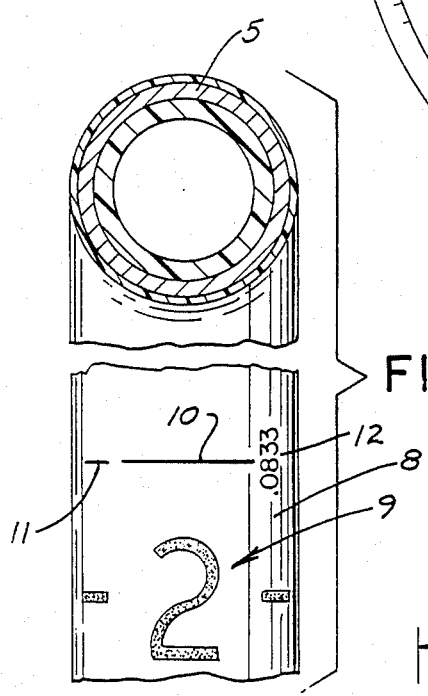
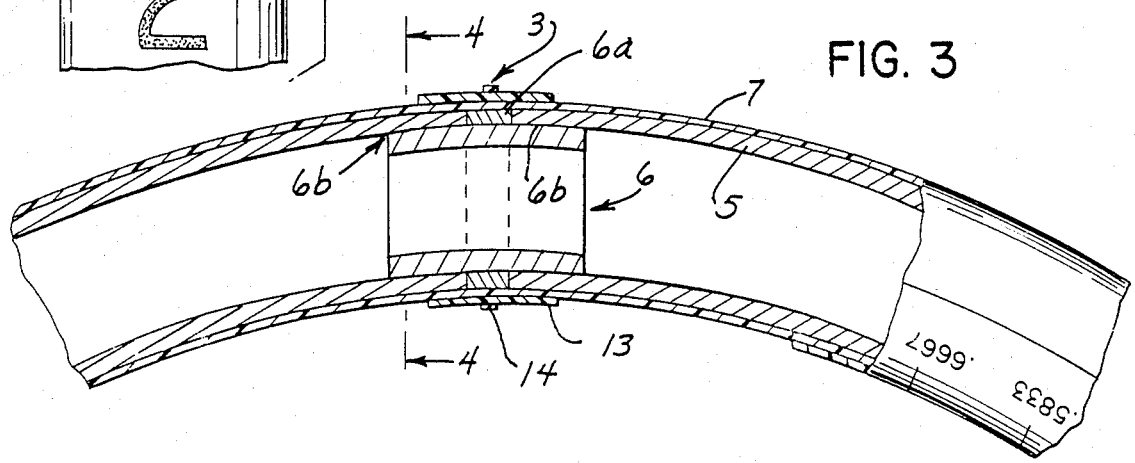

MANUALLY MANIPULATED DISTANCE MEASURING TOOL

BACKGROUND OF THE INVENTION

This invention relates to a manually operated distance measuring tool and particularly to a tool which provides for a convenient and relatively inexpensive method of measuring relatively long distances.

The prior art has long been concerned with the measurement of distances over relatively large areas. The simplest method is merely to step off a distance and assume that each step is approximately one yard. Although this is convenient, it is not accurate. Various wheel devices have been suggested over the years for measuring of linar distances over a surface. Almost universally, a rotational wheel is provided with some form of a handle or operating mechanism. To permit the operator to conveniently move the relatively small wheel over the terrain. Various forms of readout devices are couple to the rotating wheel for recording of the actual movement. A recent U.S. Pat. No. 4,176,458 which issued Dec. 4, 1979 discloses a typical unit employing a relatively small wheel coupled to an automatic digital readout device for directly providing an output reading of the distance the wheel has moved over the ground or other surface. Various other prior art patents discussed in this patent disclose the long history of development in the prior art.

Other patents which show various other forms of rotating measuring wheels for movement over a surface are shown in the following U.S. Patents:

| Patent No. | Issue Date |
|---|---|
| 1,718,052 | 06-18-1929 |
| 2,294,566 | 09-01-1942 |
| 2,741,031 | 04-10-1956 |
| 3,497,959 | 03-03-1970 |
| 3,835,453 | 09-10-1974 |
| 4,176,548 | 12-04-1979 |

All such devices, however, have certain distinct disadvantages particularly in measuring distances in certain areas. A particular problem is presented in the measurement of relatively large distances in rural areas such as encountered in farms and other similar rural environments. Thus various governmental farm programs require identification of the acreage which is being set aside or otherwise specially treated to obtain certain government payments and benefits which involve acreage set aside based on a crop base formula related to average crop production. The measuring device must be able to move over different land conditions including growing grass and the like. Further, the actual measurement is often taken under different weather conditions. Measurements are generally yearly requirements. The average farm owner can not justify a highly costly instrument which is used so infrequently and for such a short period of time.

Many other work areas also have a great demand for a relatively simple and inexpensive tool for measuring of ground distances. Thus surveyors, construction contractors, and the like often require measurement of ground and floor distances. Contractors in particular often must make various relatively accurate measurements for proposes of bidding, billing and the like. Staking of the areas within which construction is to occur often require accurate measurements between various points and the like. Other building trades such as carpenters, electricians, plumbers and mason also must measure the various distances associated with a structure in order to appropriately determine the necessary materials for use on the construction sight. Realtors could readily use such a tool during listing or showing a property. In various games, distances must be measured either during carrying out of the game or in establishing of the game. Thus, various games such as horseshoes, darts and the like require positioning of various implements and tools of the game in order to appropriately play. In field events, the distances of the game components as well as the actual extent of the movement of the participants are measured. Finally, government officials such as police departments, highway departments, departments of natural resources and the like often have measurement requirements associated with carrying out their job.

In all instances a simple inexpensive and conveniently manipulated measuring tool would be highly desired, but to the knowledge of the present applicant has not been provided.

SUMMARY OF THE INVENTION

The present invention is particularly directed to a manually operated distance measuring tool which is adapted to be moved over the ground while conveniently walking over the ground area to be measured. Generally, in accordance with the present invention, a large circular or ring member is formed which can be rolled over the ground manually while walking upright and in a comfortable position while having reliable control of the ring member. The ring member is formed without any projector members or components and maintains an unobstructed surface and central opening. In accordance with a preferred and particuly unique construction, the circular ring member is formed of a metal tube rolled into an accurate circle having a diameter of at least three feet to the outer circumferential surface, and preferably 3.1847 feet such that each revolution on the ground covers and measures exactly 10 feet. The ring member is preferably formed from an elongated metal tube which rolled and cut to the precise circumferential length and formed into a precise circle with the opposite ends of the tubular member secured to each other to form the circular ring member. The member is coated with a suitable covering such as a plastic coating to encase the member. The plastic is preferably a given color such as yellow. A starting point is marked on the wrapped circular member such as by a special different color plastic. Applicant has found that providing of a blue tape of a reasonable circumferential length and with a small yellow encircling type at the precise reference or starting point provides a very readily visually located and followed area. The precise reference point can be provided with a slight raised area to provide convenient counting of the revolutions of the circular member. The user thus merely walks along the line of measurement and rolls the large ring member over the ground counting of number of revolutions. The final revolution is read to the particular footage. The user then merely multiplies the number of revolutions by the reference such as ten feet and adds the final partial revolution. The use of a ten foot length obviously provides ready conversion of the number of revolution to the total number of feet thus by merely adding of a zero.

The large diameter unobstructed circular ring member not only provides a low cost and efficient measuring tool but one particularly adapted to use in all weather and in various environments and locations including fields. The ring member, without any central obstruction, readily moves through tall grass and other growing materials without the being intwined with the material. By using the large diameter ring member, more accurate measurement is obtained even though the ground may not be a smooth surface. The metal base with the outer protective surface provides a relatively heavy and stable ring which is readily usable in all weather conditions and with various different ground covers, including wet areas and the like.

The markings on the tool can include markings in feet in combination with both inch and decimal marks for accurate calculation of the length. In addition, a metric reading can also be provided. The coating may be a glow type paint and tapes which are readily commercially available, with the appropriate marking for convenient use in dark areas and environments.

The present invention thus provides a simple inexpensive distance measuring tool which can be constructed with simple readily available materials so as to produce a low cost measuring tool but one which maintains a high level of accuracy and very simple readily used tool.

BRIEF DESCRIPTION OF THE DRAWING

The drawing illustrates the best mode presently contemplated of carrying out the invention.

In the drawing,

FIG. 1 is a side view of the tool of the present invention in use;

FIG. 2 is an enlarged side view of the tool shown in FIG. 1;

FIG. 3 is an enlarged fragmentary section view taken generally on line 3—3 of FIG. 1; and FIG. 4 is an enlarged fragmentary view taken generally on line 4—4 of FIG. 2.

DESCRIPTION OF THE ILLUSTRATED EMBODIMENT

Referring to the drawing and particularly to FIG. 1 a large circular member or ring is shown resting on the ground 2. The ring has a diameter of at least three feet and preferably a diameter of 3.1847 feet to the outer circumferential ground engaging surface to produce the 10 foot per revolution measurement. The ring 1 then defines a length of 10 feet for each complete revolution of ring 1. The user manually manipulates the ring to roll over the ground 2. The ring 2 has a starting mark 3 located as a reference.

In addition to the starting point, the ring 1 is provided with spaced length marks 4 precisely identifying the linear length traversed by a partial movement of the ring over the ground.

In use, the user thus moves from a starting point to a final point to measure the linear distance therebetween. The tool is located at the starting point with the reference point resting on the starting point. Each revolution of the ring 1 provides a precise linear movement over the ground. By counting the revolutions from the reference mark 3, the user knows the total number of revolutions. Knowing the circumferential length of the ring, the total number of total revolutions plus the partial revolution movement allows the use to directly calculate the distance traversed.

The illustrated tool provides a very conveniently operated tool for accurate measurement of the distances troversed. The tool, however, can be readily constructed as a simple inexpensive tool but one which has a long operating life in various harsh environments, such as often encountered in the measurement of lengths in farms, construction sites and the like.

More particularly, in the illustrated embodiment of the invention, the ring is formed of a hollow tubular member 5. A highly satisfactory and typical element would be electrical conduit which can be readily obtained in various standard lengths and readily formed to the desired length. The conduit has a guage such as 0.055 and can then also be conveniently formed into a circular member with the opposite end in abutting engagement such as shown in FIG. 2. The ends are fixedly secured to each other. In the illustrated embodiment of the invention, a connecting element 6 is extended between the open ends of the bent tube or conduit. The element 6 projects into the opposite ends of the tubing with a short circumferential edge 6a located between the opposed edges of the tubing. The tubing can then be swaged down onto the connecting element 6 as at 6b to complete a continuous uninterrupted circular member. The formed circular member is then conveniently coated with a suitable paint 7 or other coating, preferably an epoxy paint. The epoxy paint can be conveniently applied using an electrostatic paint spray system to produce a tough long lasting protective coating over the metal tubing.

The measuring length marks 4 are applied to the inner side of the ring. A convenient and inexpensive application includes a clear plastic tape 8 having a self adhesive for application to the inner circumference of the ring. As illustrated, the tape 8 includes large foot identifications for each foot of movement generated by rolling of the ring on the ground. Each foot mark 9 is located centrally of the inner surface of the ring 1. Between the large foot marks and numbers are lines or marks 10 identifying each inch between the feet markings. To one side of the ring 1 and on the edge of the tape 8, each crossline is identified by an inch number 11. The opposite side is provided with identifying numbers 12 in the decimal system to four places.

The zero reference or starting point 3 is identified in the illustrated embodiment by an encircling colored tape 13 of a different color than that of the circling member. For example, a bright yellow paint 7 is advantageously applied to the circular member. A blue tape 13 encircles the circular member at the starting point. A small yellow encircling marker 14 is secured centrally of the blue tape and accurately identifies the zero starting position. The tape 13 is preferably placed at the connection of the tube and the location of the ends of tape 8 to firmly secure the latter in place.

In use, the user rotates the ring 1 on and over the ground and visually follows movement of the zero reference position 3 to count each complete revolution, using a separate manually operated counter or mentally retaining the count for each revolution. The user walks from the starting point to the final point with the wheel resting right at the final point. The user reads the particular feet and inches of movement, or to the decimal point, if so used, of the last and final revolution. The final revolution length is added to the number of revolutions times ten to provide the total length of movement in feet and inches.

The present invention thus provides a simple reliable and effective measuring tool for use in various environments and applications.

Various modes of carrying out the invention are contemplated as being within the scope of the following claims particularly pointing out and distinctly claiming the subject matter which is regarded as the invention.

I claim:

1. A measuring tool for manual rolling over a support area, comprising an unobstructed ring having a diameter of at least three feet, said ring being formed with a hollow metal tube with adjacent tube ends, a connecting element for joining the ends of said metal tube, a protective cover secured to said tube and connecting element, and length marks circumferentially spaced on said cover.

2. The tool of claim 1 including a tape member secured to the cover on the inner circumference of the ring, said marks being imprinted marks on said tape member.

3. The tool of claim 1 wherein said metal tube is a steel electrical conduit of number 0.055 gauge.

4. The tool of claim 1 having a weight of about 4.5 pounds.

5. The tool of claim 2 wherein said imprinted marks include first marks spaced to identify each foot of length and a plurality of line marks spaced between said first marks for each inch of length and extending across the ring, said first marks carrying the numbers 1 through 10, said line marks having the numbers 1 through 11 adjacent one end and the decimal equivalent number adjacent the opposite end of each line mark.

6. A ground measuring tool for manual rolling over the ground area, comprising an unobstructed ring having a diameter whereby each revolution of the ring on the ground covers 10 feet, said ring being formed with a hollow steel tube of a weight at least 4.5 pounds and 0.055 gauge, length marks circumferentially spaced on said tube and including foot marks identified by the digits 0 through 9 and a plurality of line marks spaced between said foot marks and extending across the ring, said line marks having the numbers 1 through 11 adjacent one end and the decimal equivalent number adjacent the opposite end of each line mark, said tube having a protective coating thereon, and including a tape member secured to the coating on the inner circumference of the ring, said marks being imprinted marks on said tape member.

* * * * *